United States Patent Office 3,007,944
Patented Nov. 7, 1961

3,007,944
PROCESS FOR THE OXIDATION OF TRIALKYL ETHYLENE HYDROCARBONS
Emanuel M. Amir, Baytown, Tex., assignor, by mesne assignments, to Esso Research and Engineering Company, Elizabeth, N.J., a corporation of Delaware
No Drawing. Filed Jan. 20, 1958, Ser. No. 709,788
8 Claims. (Cl. 260—348.5)

This invention relates to a process for the oxidation of olefinic hydrocarbons. More particularly, this invention is directed to a process for the preparation of mono-oxy derivatives of trialkyl ethylene hydrocarbons.

It is frequently desirable to prepare mono-oxy derivatives of aliphatic olefins, such as epoxides, ketones, aldehydes and alcohols.

It has been discovered in accordance with the present invention that when trialkyl ethylenes are subjected to liquid phase air oxidation, the oxidation product may be contaminated with tertiary hydroperoxides which are undesirable from the point of view of safety and product recovery when the product to be obtained is a mono-oxy monoolefin.

It has been further discovered that this problem may be overcome by subjecting a trialkyl ethylene hydrocarbon feed stock to aqueous liquid phase air oxidation at a pH of about 7.0 to 8.5 in the presence of a catalytic amount of salt of a heavy metal of groups VI to VIII of the periodic table.

Suitable trialkyl ethylene feed stocks for the present invention include a wide variety of monoolefins such as 2-methyl-2-butene, 2-methyl-2-pentene, 3-methyl-2-pentene, 2-methyl-2-hexene, 3-methyl-2-hexene, 3-methyl-3-hexene, 2,4-dimethyl-2-pentene, 3,4-dimethyl-2-pentene, etc. and mixtures thereof. It will be understood that the trialkyl ethylenes may be used in a substantially purified condition or may be present as a component of an olefinic feed stock containing other monoolefins.

The trialkyl ethylene-containing feed stock is oxidized with molecular oxygen in liquid phase in an aqueous system under reaction conditions which preferably include a temperature within the range of about 40° to reflux temperature at atmospheric pressure.

The amount of water to be employed for the aqueous phase may be varied within comparatively wide limits. In general, however, from about 0.1 to about 2 volumes of water per volume of hydrocarbon feed stock should be employed. The pH of the aqueous phase should be maintained within the range of about 7.0 to 8.5. When this is done, a product is obtained which is substantially completely free from hydroperoxides. In the absence of an aqueous phase oxidation or with a pH outside of the indicated range, a product is obtained which is contaminated with substantial amounts of hydroperoxide byproducts. The pH of the aqueous phase is preferably maintained at the preferred range with a buffer which is non-reactive with the catalyst.

The oxidation catalyst to be employed in accordance with the present invention is a salt of a heavy metal of groups VI and VIII of the periodic table. The salt should be soluble in the aqueous phase, the hydrocarbon phase, or both. Representative oxidation catalysts soluble in at least the aqueous or oil phase of the reaction system include cobalt naphthenate, cobalt stearate, cobalt acetate, cobalt toluate, manganese naphthenate, manganese acetate, ferrous naphthenate, ferrous acetate, ferrous phthalocyanine, etc. and suitable mixtures thereof.

The oxidation reaction is preferably conducted for a period of time within the range of about 1 to 8 hours sufficient to convert from about 10 to about 70 mol percent of the olefin feed stock to mono-oxygenated compounds including ketones, aldehydes, oxirane epoxides and alcohols. Such oxygenated derivatives are useful for a wide variety of purposes. Thus, the unsaturated ketones and alcohols can be converted by hydrogenation and dehydrogenation to aliphatic ketones, such aliphatic ketones comprising a valuable class of organic solvents. The oxirane epoxide derivatives may be utilized as chemical intermediates for the preparation of plastics, etc. or may be converted to ketonic solvents. The alcohols may be utilized for purposes such as solvents, plasticizers, and intermediates.

The invention will be further illustrated by the following specific examples involving tri lower alkyl ethylene hydrocarbons which are given by way of illustration and not intended as limitations on the scope of this invention.

EXAMPLE I

A charge stock consisting of about 4 mols of 2-methyl-2-pentene of about 95 percent purity was heated to reflux temperature in the presence of oxygen and thereafter an amount of cobalt naphthenate was charged sufficient to provide for about 15 milligrams of cobalt per mol of feed stock. There was also charged about 2.5 mols of water per mol of feed stock, the water being buffered with sodium carbonate/sodium bicarbonate to provide for a pH of about 7 to 8. The reaction was conducted for about 7.5 hours at reflux temperature (63° to 66° C.), during which time about 40 percent of the charge stock was converted to mono-oxy derivatives. At the end of this time, the reaction mixture was cooled and the oil layer was separated from the aqueous phase. The reaction product contained only trace amounts of hydroperoxide. The oxygenated product could be distilled at atmospheric pressure without decomposition to provide fractions of constant boiling range. In Table I there is set forth a partial analysis of the products obtained from this reaction.

TABLE I

Analytical results

| | Weigh percen |
|---|---|
| Acetone | 0.7 |
| 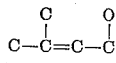 (2-methyl-2-pentene-4-ol) | 11.5 |
| 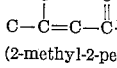 (2-methyl-2-pentene-4-one) | 8.2 |
| 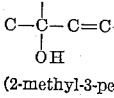 (2-methyl-3-pentene-2-ol) | 10.5 |
| 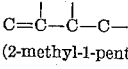 (2-methyl-1-pentene-3-ol) | 7.5 |
| 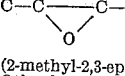 (2-methyl-2,3-epoxy pentane) | 34.2 |
| Other ketones, alcohols and residue | 27.4 |

EXAMPLE II

Example I was repeated except that the feed was 3-methyl-2-pentene. Equivalent results were obtained and the reaction product contained only trace amounts of peroxides. A partial analysis of a representative product obtained in Example II is shown in Table II.

TABLE II

| | | |
|---|---|---|
| 2-butanone | mol percent | 6.5 |
| 3-methyl-2,3-epoxy petane | do | 36.4 |
| 3-methyl-3-pentene-2-one | do | 4.0 |
| 3-ethyl-3-butene-2-ol | do | 4.6 |
| 3-methyl-3-pentene-2-ol | do | 5.1 |
| Other ketones and alcohols | do | 28.4 |
| Residue | grams | 24 |

EXAMPLE III

A charge consisting of about 10 mols of 2-methyl-2-pentene of about 95 percent purity was heated at a temperature within the range of about 67° to 69° C. in the presence of about 3 milligrams of cobalt naphthenate for about 8 hours, whereby about 0.35 mol of oxygen was absorbed. The product was highly contaminated with peroxides, having a peroxide number of about 1240.

EXAMPLE IV

About 0.5 mol of 2-methyl-2-pentene was dissolved in about 80 ml. of glacial acetic acid, the resultant solution was heated to reflux while passing oxygen therethrough and then about 20 milligrams of ferrous phthalocyanine was added. At the end of about 5.5 hours of reaction at reflux temperature (75° to 81° C.), the product was sampled and found to give a strong peroxide test. The reaction was then continued for an additional 7 hours to provide a product which was highly contaminated with peroxides. On neutralization with solid sodium bicarbonate, a very viscous, dark brown oil was formed which could not be crystallized or distilled.

EXAMPLE V

A reaction mixture was prepared containing about 4.0 mols of 2-methyl-2-pentene, 60 milligrams of cobalt naphthenate and 160 ml. of a sodium carbonate solution having a pH of about 9.5 to 10. The reaction mixture was heated at reflux temperature (65° to 60° C.) for about 8 hours whereby about 0.6 mol of oxygen was absorbed; pH measurements made during the experiment showed that the aqueous layer had a pH of about 9.5 to 10. The product gave a very strong peroxide test, having a peroxide number of about 900.

EXAMPLE VI

Example I was repeated employing an unbuffered aqueous phase. After initiation of the oxidation reaction, the pH of the aqueous phase had a value of about 5. The product gave a strong test for peroxides, having a peroxide number of 540.

Having described my invention, what I claim is:

1. A process which comprises subjecting a trialkyl ethylene hydrocarbon to aqueous liquid phase oxidation with oxygen at a temperature within the range of about 40° F. to about reflux temperature in the presence of a catalytic amount of a soluble salt of a metal of groups VI through VIII of the periodic table at a pH within the range of about 7 to about 8.5 whereby there is formed a substantially hydroperoxide free oxidation product containing aldehydic, ketonic, alcoholic and oxirane addition products of oxygen and said trialkyl ethylene, and recovering said addition products.

2. A process which comprises subjecting a liquid trialkyl ethylene hydrocarbon to aqueous liquid phase oxidation with oxygen at a temperature within the range of about 40° F. to about reflux temperature in the presence of a catalytic amount of a soluble salt of a metal of groups VI through VIII of the periodic table at a pH within the range of about 7 to about 8.5 whereby there is formed a substantially hydroperoxide free oxidation product containing aldehydic, ketonic, alcoholic and oxirane addition products of oxygen and said trialkyl ethylene, and recovering said addition products.

3. A process which comprises subjecting a liquid trialkyl ethylene hydrocarbon chosen from the group consisting of methyl substituted pentene-2 hydrocarbons to aqueous liquid phase oxidation with oxygen at a temperature within the range of about 40° F. to about reflux temperature in the presence of a catalytic amount of a soluble salt of a metal of groups VI through VIII of the periodic table at a pH within the range of about 7 to about 8.5 whereby there is formed a substantially hydroperoxide free oxidation product containing aldehydic, ketonic, alcoholic and oxirane addition products of oxygen and said trialkyl ethylene, and recovering said addition products.

4. A process which comprises subjecting a normally liquid tri lower alkyl ethylene hydrocarbon to aqueous liquid phase oxidation with oxygen at a temperature within the range of about 40° F. to about reflux temperature in the presence of a catalytic amount of a soluble salt of a metal of groups VI through VIII of the periodic table, from about 0.1 to about 2.0 mols of water per mol of trialkyl ethylene hydrocarbon being employed, said water containing an amount of a non-reactive buffer sufficient to provide a pH within the range of about 7 to 8.5 whereby there is formed a substantially hydro-peroxide free oxidation product containing aldehydic, ketonic, alcoholic and oxirane addition products of oxygen and said trialkyl ethylene, and recovering said addition products.

5. A process as in claim 4 wherein the catalyst is cobalt naphthenate.

6. A process which comprises subjecting 2-methyl-2-pentene to atmospheric liquid phase oxidation with molecular oxygen at a temperature within the range of about 40° F. to about reflux temperature in the presence of about 0.1 to about 2.0 mols of water per mol of 2-methyl-2-pentene at a pH within the range of about 7 to about 8.5 and in the further presence of a catalytic amount of a soluble salt of a polyvalent metal of groups VI to VIII of the periodic table to thereby convert 2-methyl-2-pentene into a mixture consisting of 2-methyl-2-pentene-4-ol, 2-methyl-2-pentene-4-one, 2-methyl-3-pentene-2-ol, 2-methyl-1-pentene-3-ol, and 2-methyl-2,3-epoxy pentane and recovering said mixture at the end of said reaction, said mixture being substantially free from tertiary hydroperoxides.

7. A process which comprises subjecting 3-methyl-2-pentene to atmospheric liquid phase oxidation with molecular oxygen at a temperature within the range of about 40° F. to about reflux temperature in the presence of about 0.1 to about 2.0 mols of water per mol of 3-methyl-2-pentene at a pH within the range of about 7 to about 8.5 and in the further presence of a catalytic amount of a soluble salt of a polyvalent metal of groups VI to VIII of the periodic table to thereby convert 3-methyl-2-pentene into a mixture consisting of 2-butanone, 3-methyl-2,3-epoxy-pentane, 3-methyl-3-pentene-2-one, 3-ethyl-3-butene-2-ol, and 3-methyl-3-pentene-3-ol and recovering said mixture at the end of said reaction, said mixture being substantially free from tertiary hydroperoxides.

8. A process which comprises subjecting a trialkyl ethylene hydrocarbon containing from 1 to 3 carbon atoms per alkyl group to aqueous liquid phase oxidation in the presence of about 0.1 to 2 volumes of water per volume of trialkyl ethylene hydrocarbon with oxygen in the presence of a catalytic amount of a soluble salt of a metal selected from the group consisting of cobalt and manganese at a pH within the range of about 7 to 8.5 for about 1 to 8 hours at atmospheric pressure at a temperature within the range of about 40° F. to reflux temperature whereby there is formed a substantially hydroperoxide free oxidation product containing aldehydic, ketonic, alcoholic, and epoxide addition products of oxygen and said trialkyl ethylene and recovering said addition products.

References Cited in the file of this patent

UNITED STATES PATENTS

| | | |
|---|---|---|
| 2,052,195 | Schneider et al. | Aug. 25, 1936 |
| 2,316,604 | Loder et al. | Apr. 13, 1943 |
| 2,620,358 | Detling et al. | Dec. 2, 1952 |
| 2,650,927 | Gasson et al. | Sept. 1, 1953 |
| 2,690,457 | Hackmann | Sept. 28, 1954 |
| 2,741,623 | Millidge et al. | Apr. 10, 1956 |
| 2,780,634 | Robertson | Feb. 5, 1957 |
| 2,879,300 | Cheney et al. | Mar. 24, 1959 |